United States Patent
Bailey

(10) Patent No.: US 12,262,106 B2
(45) Date of Patent: Mar. 25, 2025

(54) IMAGE CAPTURING ASSEMBLY

(71) Applicant: ANGLO AMERICAN STEELMAKING COAL PTY LTD, Brisbane (AU)

(72) Inventor: Ian Bailey, Cannon Hill (AU)

(73) Assignee: ANGLO AMERICAN STEELMAKING COAL PTY LTD, Brisbane (AU)

( * ) Notice: Subject to any disclaimer, the term of this patent is extended or adjusted under 35 U.S.C. 154(b) by 27 days.

(21) Appl. No.: 18/259,239

(22) PCT Filed: Dec. 22, 2021

(86) PCT No.: PCT/AU2021/051538
§ 371 (c)(1),
(2) Date: Jun. 23, 2023

(87) PCT Pub. No.: WO2022/133533
PCT Pub. Date: Jun. 30, 2022

(65) Prior Publication Data
US 2024/0121496 A1    Apr. 11, 2024

(30) Foreign Application Priority Data
Dec. 23, 2020   (AU) ................................ 2020904826

(51) Int. Cl.
*H04N 23/50*    (2023.01)
(52) U.S. Cl.
CPC ................................ *H04N 23/555* (2023.01)

(58) Field of Classification Search
CPC ........ E21B 47/002; E21F 9/00; G03B 37/005; G03B 37/04; H04N 23/555
See application file for complete search history.

(56) References Cited

U.S. PATENT DOCUMENTS 4,331,975 A * 5/1982 Krawza ................ G01B 11/026
                                                    348/E7.088
4,532,545 A    7/1985 Hanson
(Continued)

FOREIGN PATENT DOCUMENTS

AU    2009210391 A1    3/2010
CN      116411935 A    7/2023
(Continued)

OTHER PUBLICATIONS

ISA/AU; Search Report for PCT/AU2021/051538 mailed Feb. 14, 2022.
(Continued)

*Primary Examiner* — Mohammed S Rahaman
(74) *Attorney, Agent, or Firm* — Crowe & Dunlevy, P.C.

(57) ABSTRACT

Disclosed herein is an image capturing assembly for an underground environment. The assembly may comprise an elongate body configured to be placed within a borehole. The body may comprise an outer wall that defines an internal chamber therein, a first camera aperture, and a first light aperture disposed in the outer wall of the body. The assembly may also comprise a first camera mounted within the chamber and a first light mounted within the chamber to illuminate the underground environment.

19 Claims, 12 Drawing Sheets

(56) References Cited

U.S. PATENT DOCUMENTS

| | | | |
|---|---|---|---|
| 2006/0144945 A1* | 7/2006 | He | G06K 19/063 235/462.14 |
| 2012/0169841 A1* | 7/2012 | Chemali | E21B 47/002 348/E7.001 |
| 2014/0278111 A1 | 9/2014 | Gerrie et al. | |
| 2015/0007983 A1 | 1/2015 | Tjhang | |
| 2016/0261829 A1 | 9/2016 | Olsson et al. | |
| 2019/0377254 A1 | 12/2019 | Thursby et al. | |

FOREIGN PATENT DOCUMENTS

| | | | |
|---|---|---|---|
| GB | 2582561 A | | 9/2020 |
| JP | 2008046032 A | | 2/2008 |
| WO | 2006078945 A1 | | 7/2006 |
| WO | WO-2019215070 A1 | * | 11/2019 |

OTHER PUBLICATIONS

IPEA/AU; Written Opinion of the International Preliminary Examining Authority for PCT/AU2021/051538 mailed Feb. 17, 2023.
ISA/AU; Written Opinion for PCT/AU2021/051538 mailed Feb. 14, 2022.
Chilean Examiner's Report for Patent Application No. 202301841 mailed Sep. 4, 2024.
Extended European Search Report for EP Patent Application No. 21908145.2 mailed Nov. 8, 2024.

* cited by examiner

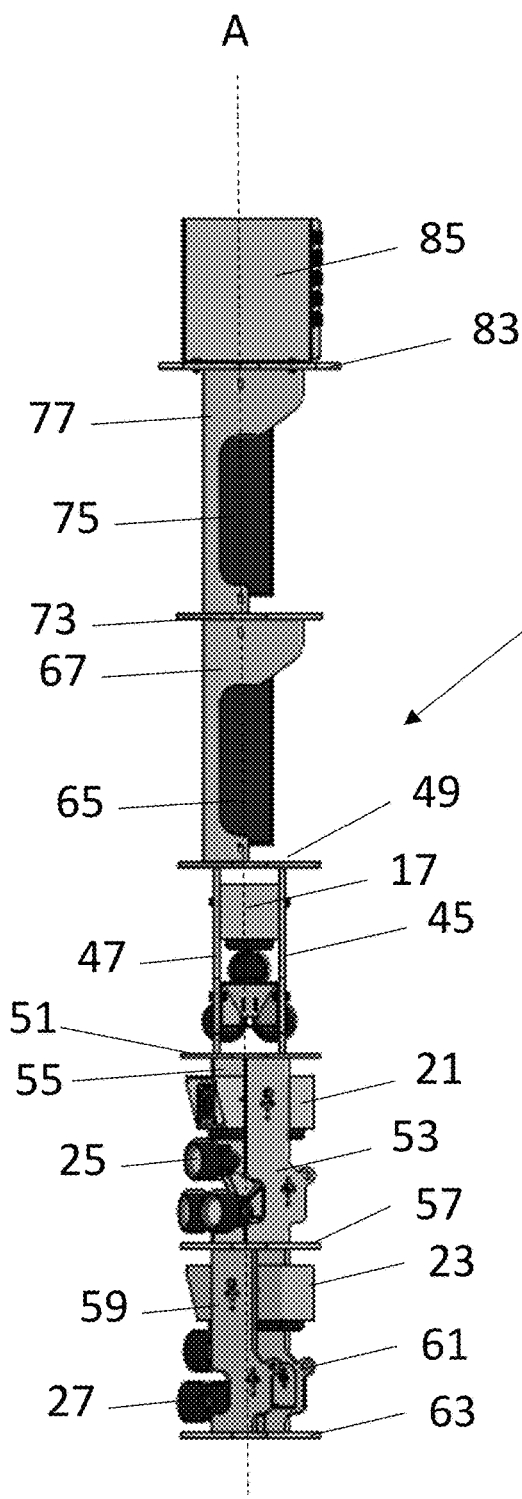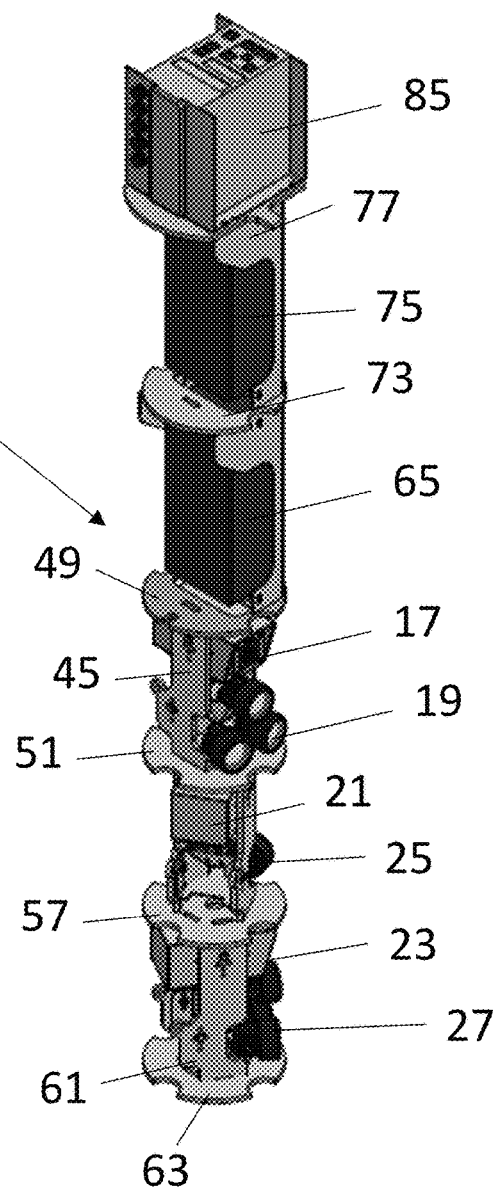
Fig. 5                    Fig. 6

203

IMAGE CAPTURING ASSEMBLY

TECHNICAL FIELD

Disclosed herein is an image capturing assembly for an underground environment that may be used in, for example, an explosion risk zone of a coal mine. The assembly includes an elongate body, a camera mounted within a chamber of the body and a light mounted within the chamber of the body to illuminate the underground environment.

BACKGROUND ART

Underground coal mines typically include hazardous areas that are categorised as "explosion risk zones". These areas may be at risk of a build-up of methane or coal dust. Methane, a readily ignitable gas, is a by-product of coal formation that may be released from coal as it is mined. Underground coal mining also produces coal dust that may provide a source of combustible material for coal dust explosions. Coal dust is also able to be ignited in the event that a build-up occurs to a high concentration.

The concentration of methane and coal dust is managed in explosion risk zones using ventilation. Fans may be used to circulate air underground to reduce the concentration of methane and coal dust in the air. Underground coal mines may also include methane sensors to monitor the concentration of methane in explosion risk zones.

Coal dust explosions may occur as a result of a methane explosion, where a pressure wave from a methane explosion causes coal dust to increase in concentration at a location within the mine. Methane and coal dust explosions can be catastrophic and have caused a significant number of fatalities.

Explosions may be caused by sparks and heat generated by electrical equipment. For that reason, electrical equipment and electrical installations in an underground coal mine may require high standards of design, installation and maintenance, particularly for use in explosion risk zones. Standard electrical equipment and electrical installations are typically not sufficient to mitigate the risk of explosion in coal mines. Therefore, standards have been developed for electrical equipment and electrical installations used for coal mines internationally to reduce the risk associated with coal mining to an acceptable level. An example of this in Queensland Australia is the Coal Mining Safety and Health Regulation 2017 (CMSHR 2017).

CMSHR 2017 provides categories for explosion risk zones. The highest risk zone is categorised as "explosion risk zone 0" (ERZ0). ERZ0 applies to an underground mine, or any part of an underground mine, where the general body concentration of methane is known to be, or is identified by a risk assessment as likely to be, greater than 2%. ERZ0 also applies to any part of an underground mine being sealed.

Amongst other things, CMSHR 2017 requires that for zones categorised as ERZ0, the site senior executive for an underground mine must ensure electrical equipment installed or operated in an ERZ0 at the mine is certified as having a particular explosion protection category (these are termed Ex ia, Ex s or Ex 1 in CMSHR 2017).

In a circumstance where a mine over-pressure incident occurs in an underground zone categorised as ERZ0, all persons within the mine zone are evacuated from underground. In this circumstance, it is not possible to physical access the underground environment (e.g. for inspection purposes to assess the cause). At present, mine operators wait until the mine over-pressure incident has subsided before people are able to physically access the underground environment. This may take weeks and may be costly to the mine operator as mining is ceased during an over-pressure incident.

In this specification, unless the contrary is expressly stated, where a document, act or item of knowledge is referred to or discussed, this reference or discussion is not an admission that the document, act or item of knowledge or any combination thereof was at the priority date, publicly available, known to the public, part of common general knowledge; or known to be relevant to an attempt to solve any problem with which this specification is concerned.

SUMMARY

Disclosed herein is an image capturing assembly for an underground environment. The assembly may comprise; an elongate body configured to be placed within a borehole disposed within the underground environment, the body extending along a longitudinal axis of the body between proximal and distal ends and comprising; an outer wall that defines an internal chamber therein; and a first camera aperture and a first light aperture disposed in the outer wall of the body; a first camera mounted within the chamber such that it is substantially aligned with the first camera aperture, the first camera being configured to capture images of the underground environment; and a first light mounted within the chamber such that it is substantially aligned with the first light aperture, the first light being configured to illuminate the underground environment.

In some forms, the body may comprise a second light aperture and a second camera aperture.

In some forms, the assembly may comprise a second camera mounted within the chamber such that it is substantially aligned with the second camera aperture, the second camera being configured to capture images of the underground environment; and a second light mounted within the chamber such that it is substantially aligned with the second light aperture, the second light being configured to illuminate the underground environment.

In some forms, the body may comprise a third light aperture and a third camera aperture. In some forms, the assembly may comprise; a third camera mounted within the chamber such that it is substantially aligned with the third camera aperture, the third camera being configured to capture images of the underground environment; and a third light mounted within the chamber such that it is substantially aligned with the third light aperture, the third light being configured to illuminate the underground environment.

In some forms, the first camera aperture extends along a first camera axis that is substantially perpendicular to the longitudinal axis of the body; the second camera aperture extends along a second camera axis that is offset from the first camera axis by around 120°; the third camera aperture extends along a third camera axis that is offset from the first camera axis by around 120° and from the second camera axis by around 120°; the images of the underground environment captured by the first camera are offset from the images of the underground environment captured by the second camera by around 120°; the images of the underground environment captured by the second camera are offset from the images of the underground environment captured by the third camera by around 120°; and the images of the underground environment captured by the third camera are offset from the images of the underground environment captured by the first camera by around 120°.

In some forms, the images captured by the first, second and third cameras are able to be combined to generate 360° images of the underground environment.

In some forms, the first light aperture extends along a first light axis that is substantially perpendicular to the longitudinal axis of the body; the second light aperture extends along a second light axis that is offset from the first light axis by around 120°; and the third light aperture extends along a third light axis that is offset from the first light axis by around 120° and from the second light axis by around 120°.

In some forms, the first light aperture may comprise three first light apertures that are each disposed in the outer wall of the body, the three first apertures being disposed in close proximity to one another. In some forms, the second light aperture may comprise three second light apertures that are each disposed in the outer wall of the body, the three second apertures being disposed in close proximity to one another. In some forms, the third light aperture may comprise three third light apertures that are each disposed in the outer wall of the body, the three third apertures being disposed in close proximity to one another.

In some forms, the first light may comprise three lights, each of the three lights being substantially aligned with one of the three first light apertures. In some forms, the second light may comprise three lights, each of the three lights being substantially aligned with one of the three second light apertures. In some forms, the third light may comprise three lights, each of the three lights being substantially aligned with one of the three third apertures.

In some forms, the assembly may comprise an elongate support assembly mounted within the chamber, the elongate support assembly extending along the longitudinal axis of the body between the distal and proximal ends of the body and being configured to support the first camera and first light.

In some forms, the elongate support assembly may comprise a first spaced pair of mounting flanges extending substantially parallel to the longitudinal axis of the body, wherein the first camera is mounted between the first pair of spaced flanges at a first position, and wherein the first light is mounted between the first pair of spaced flanges at a second position, the first position being disposed above the second position in use.

In some forms, the elongate support assembly may comprise; first and second plates that extend substantially perpendicular to the first pair of mounting flanges, the first plate being mounted to an upper end of each of the first pair of mounting flanges, the second plate being mounted to a lower end of the each of the first pair of mounting flanges.

In some forms, the first light may comprise a first light support configured to mount the first light between the first pair of mounting flanges.

In some forms, the elongate support assembly may comprise; a second spaced pair of mounting flanges extending substantially parallel to the longitudinal axis of the body, wherein the second camera is mounted between the second pair of spaced flanges at a third position, and wherein the second light is mounted between the second pair of spaced flanges at a fourth position, the third position being disposed above the fourth position in use.

In some forms, the elongate support assembly may comprise; a third plate that extends substantially parallel to the first and second plates, the second pair of mounting flanges being mounted between the second and third plates such that the second pair of mounting flanges are offset from the first pair of mounting flanges by 120°.

In some forms, the second light may comprise a second light support configured to mount the second light between the second pair of mounting flanges.

In some forms, the elongate support assembly may comprise; a third spaced pair of mounting flanges extending substantially parallel to the longitudinal axis of the body, wherein the third camera is mounted between the third pair of spaced flanges at a fifth position, and wherein the third light is mounted between the third pair of spaced flanges at a sixth position, the fifth position being disposed above the sixth position in use.

In some forms, the elongate support assembly may comprise; a fourth plate that extends substantially parallel to the first, second and third plates, the third pair of mounting flanges being mounted between the third and fourth plates such that the third pair of mounting flanges are offset from the first and second pair of mounting flanges by 120°.

In some forms, the third light may comprise a third light support configured to mount the third light between the third pair of mounting flanges.

In some forms, the assembly may comprise a first junction box configured to allow electrical power and data communication to be connected to the assembly. In some forms, the elongate support assembly may comprise; a fourth spaced pair of mounting flanges extending substantially parallel to the longitudinal axis of the body and a first backing plate mounted between the fourth pair of mounting flanges, the first backing plate having an aperture formed therethrough that is configured to allow for electrical power and data communication to be connected to the first junction box, the first junction box being mounted between the fourth pair of spaced flanges at a seventh position such that the first junction box disposed adjacent the first backing plate, the seventh position being disposed above the first position in use; and a fifth plate that extends substantially parallel to the first, second, third and fourth plates, the fourth pair of mounting flanges being mounted between the first and fifth plates.

In some forms, the assembly may comprise a second junction box configured to allow electrical power and data communication to be connected to the assembly.

In some forms, the elongate support assembly may comprise; a fifth spaced pair of mounting flanges extending substantially parallel to the longitudinal axis of the body and a second backing plate mounted between the fifth pair of mounting flanges, the second backing plate having an aperture formed therethrough that is configured to allow for electrical power and data communication to be connected to the second junction box, the second junction box being mounted between the fifth pair of spaced flanges at an eighth position such that the second junction box disposed adjacent the second backing plate, the eigth position being disposed above the seventh position in use; and a sixth plate that extends substantially parallel to the first, second, third, fourth and fifth plates, the fifth pair of mounting flanges being mounted between the fifth and sixth plates.

In some forms, the assembly may comprise an uninterrupted power supply (UPS) configured to supply power to the assembly.

In some forms, the UPS is mounted to the sixth plate such that it is disposed adjacent the proximal end of the body.

In some forms, the body may comprise; a substantially cylindrical portion disposed between the proximal and distal ends of the body; a first tapered nose portion disposed at the proximal end of the body, the first tapered nose portion being connected to the cylindrical portion of the body, the lifting lug being mounted to the first tapered nose portion; and a second tapered nose portion disposed at the distal end of the body, the second tapered nose portion being connected to the cylindrical portion of the body.

In some forms, the first tapered portion may comprise one or more apertures formed therethrough to allow electrical power and data communication cables to enter the chamber.

In some forms, the cylindrical portion of the body may comprise; a bulbous portion disposed towards the proximal end of the body, the bulbous portion being connected to the first tapered nose; and a narrow portion disposed towards the distal end of the body, the narrow portion being disposed between a lower portion of the bulbous portion and the second tapered nose; wherein the narrow portion has a first cross-sectional diameter and the bulbous portion has a second cross-sectional diameter, the first cross-sectional diameter being less than the second cross-sectional diameter.

In some forms, the UPS is disposed within the bulbous portion of the body.

In some forms, the first, second and third cameras, and first, second and third lights, are disposed within the narrow portion of the body.

In some forms, the elongate support extends through the bulbous and narrow portions of the body.

In some forms, the assembly may comprise stand configured to receive and thereby support the body when not operational.

In some forms, the stand may comprise a pair of spaced cylindrical plates mounted between three spaced legs, the pair of cylindrical plates having apertures formed therethrough of varying diameter to correspond with the shape of the second tapered nose.

In some forms, the assembly may comprise a lifting lug disposed at the proximal end of the body, the lifting lug being configured to allow the assembly to be located within and removed from the borehole.

Also disclosed herein is a method of capturing images of an underground environment with an image capturing assembly that may comprise an elongate body configured to be placed within a borehole disposed in the underground environment, an outer wall that defines an internal chamber therein, a camera mounted within the chamber that is configured to capture images of the underground environment, and a light mounted within the chamber that is configured to illuminate the underground environment. The method may comprise mounting the image capturing assembly to a winch system; lowering the image capturing assembly down the borehole; capturing images of the underground environment with the camera; and communicating the captured images to a computer system.

BRIEF DESCRIPTION OF DRAWINGS

Various embodiments/aspects of the disclosure will now be described with reference to the following figures.

FIG. 5 provides a side view of the internal support of the assembly shown in FIG. 1;

FIG. 6 provides a perspective view of the internal support of the assembly shown in FIG. 1;

DETAILED DESCRIPTION

Disclosed herein is an image capturing assembly for an underground environment. In at least one embodiment, the image capturing assembly is able to be safely used in an underground coal mine in an explosion risk zone (e.g. ERZ0 in Queensland, Australia) whether this be a sealed or unsealed area of the mine. The image capturing assembly is able to be used at, for example, a coal mine to understand the underground conditions for the safe recovery of the operation after an incident (e.g. a mine over-pressure incident which has caused the evacuation of all persons from underground and meant that it is not possible to physically access the underground environment for inspection purposes).

The embodiment of the image capturing assembly disclosed herein with reference to the accompanying figures is designed to be compliant with CMSHR 2017. As the skilled addressee will appreciate, it would be possible to make an necessary adaptations to the image capturing assembly disclosed herein to comply with other similar regulatory requirements (e.g. those of other states in Australia or in overseas jurisdictions) without deviating from the substance of the disclosure. To comply with CMSHR 2017, the image capturing assembly disclosed herein with reference to the accompanying figures is certified "Ex ia", which includes several components collectively in an overall casing design to be used in a sealed or unsealed ERZ0 section of an underground mine. Advantageously, due to the certification of the disclosed embodiments being Ex ia under CMSHR 2017, there is no requirement for the system to have continuous gas monitoring, or having to switch the equipment electricity supply off and withdraw the equipment to a safe location in the event that the general body concentration of oxygen around the assembly exceeds 60% of an oxygen nose point identified in a risk assessment.

Two embodiments of the image capturing assembly are disclosed herein. FIGS. 1 to 9 detail the first embodiment, which includes 'Ex ia' rated cameras, lights and and onboard battery power supply (UPS). The information captured by the the camera may be supplied by fibre optic cable which may be connected to a winch rope when the image capturing assembly is lowered into a borehole. Data may be transferred from the first embodiment to a laptop computer on the surface. FIGS. 10 to 14 detail the second embodiment, which is a slime line variant (i.e. smaller diameter) relative to the first embodiment. The second embodiment also includes 'Ex ia' rated cameras and lights. In this embodiment, the battery power supply (UPS) is on the surface and supplied by a cable to the cameras, which may be connected to the winch rope when the camera is lowered down the borehole. The information for the camera may be supplied by fibre optic cable which may connected to the winch rope when lowered. Data may be transferred from the second embodiment to a laptop computer on the surface.

Figure 1:
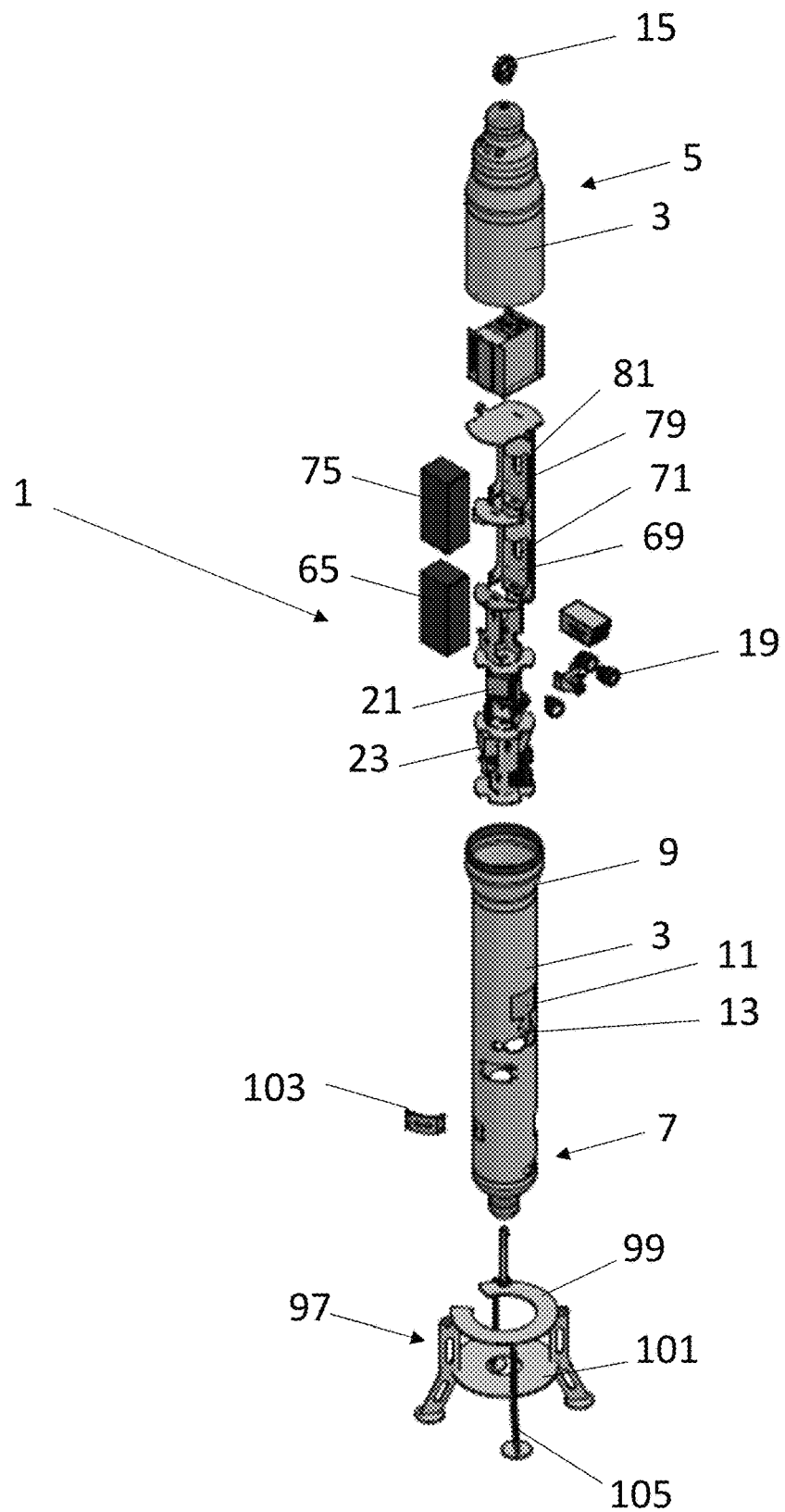
FIG. 1 provides an exploded view of an image capturing assembly according to a first embodiment of the present disclosure.

Referring now to FIGS. 1 to 9, the image capturing assembly will be described in further detail. FIG. 1 provides an exploded view of the first embodiment of the image capturing assembly. The image capturing assembly 1 includes an elongate body 3 configured to be placed within a borehole disposed within the underground environment. The body 3 extends along a longitudinal axis A (see FIG. 3) of the body 3 between proximal 5 and distal 7 ends.

The body 3 includes an outer wall 9 that defines (e.g. surrounds) an internal chamber therein. The body 3 includes a first camera aperture 11 and a first light aperture 13 disposed in the outer wall 9 of the body 3. The body also includes a lifting lug, in the form of an eyelet 15 disposed at the proximal end 5 of the body 3. The eyelet is configured to allow the assembly to be located within and removed from the borehole (e.g. using a winch that is connected to the eyelet 15 for the purposes of lowering the assembly into a borehole, and from withdrawing the assembly from the borehole). As will be apparent to the skilled addressee, alternate lifting means could be implemented.

The assembly 1 includes a first camera 17 mounted within the chamber such that it is substantially aligned with the first camera aperture 11. The first camera is configured to capture images of the underground environment. The assembly also includes a first light 19 mounted within the chamber such that it is substantially aligned with the first light aperture 13. In the detailed embodiments, the first light aperture 13 partially overlaps with the first camera aperture 11 (i.e. the apertures are connected to form a single aperture). The first light is configured to illuminate the underground environment (e.g. such that the first camera is able to capture illuminated images of the underground environment). The first light and camera are located in close proximity to one another to facilitate this purpose. In the detailed embodiment, the light is located directly below the camera.

Figure 2:
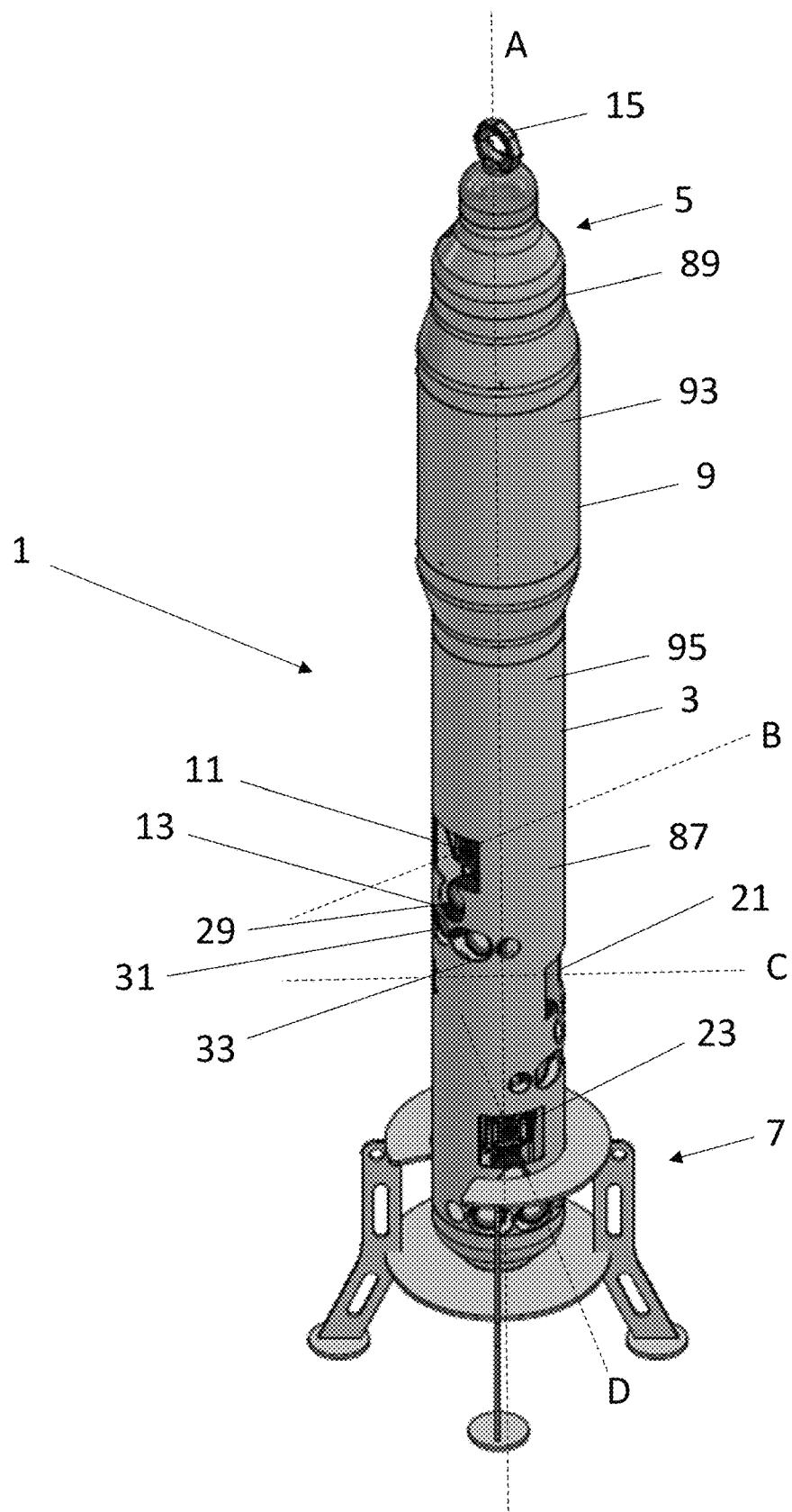
FIG. 2 provides a perspective view of the image capturing assembly shown in FIG. 1.
Figure 3:
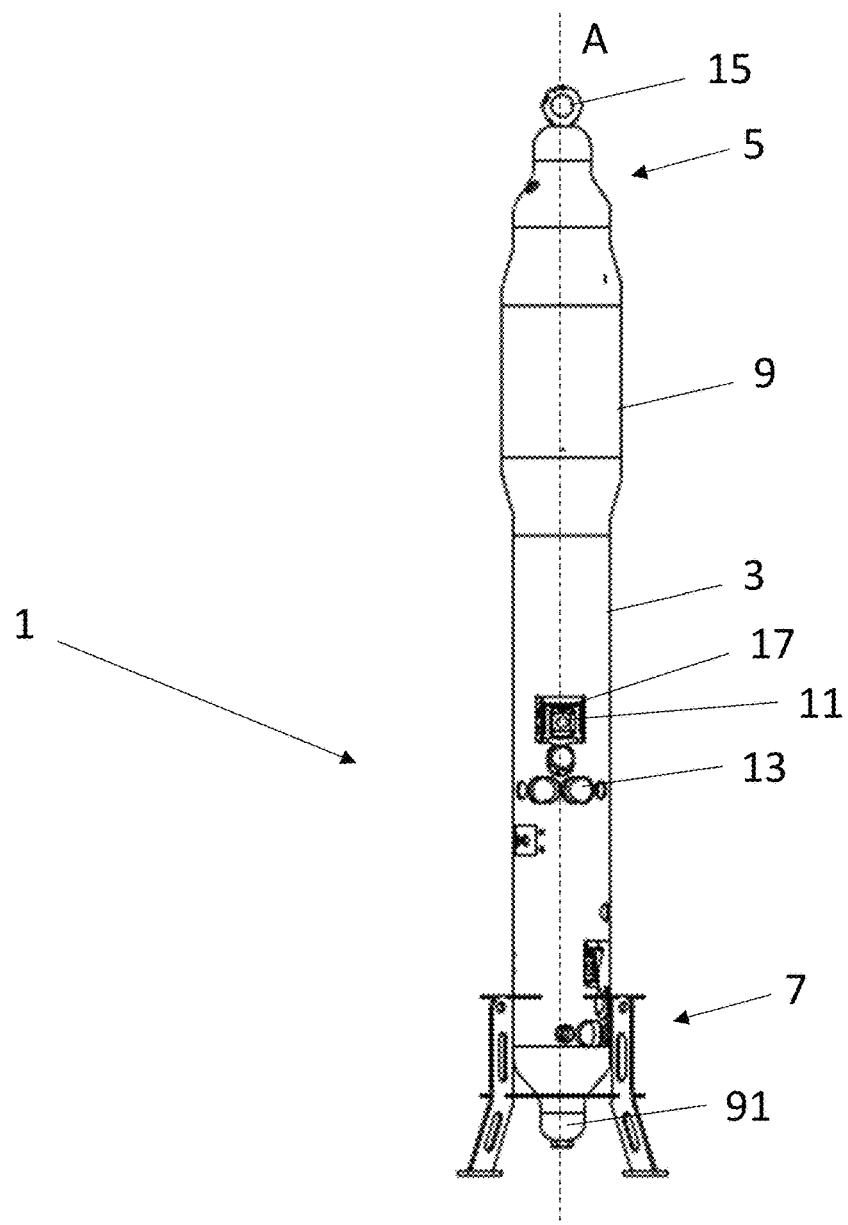
FIG. 3 provides a side view of the image capturing assembly shown in FIG. 1.

As is shown in FIGS. 5 and 6, the assembly disclosed herein also includes two further cameras 21, 23 (e.g. second and third cameras) and two further lights 25, 27 (e.g. second and third lights) mounted within the chamber. In a similar manner to the first light and camera, the additional lights and cameras are also configured to illuminate and capture images of the underground environment. As is shown in FIGS. 2 and 3, the body 3 includes additional apertures (e.g. a second light aperture, a second camera aperture, a third light aperture, and a third camera aperture) that are substantially aligned with the respective light or camera. As will be evident to the skilled addressee, while multiple separate apertures are described (e.g. are separated by the outer wall of the body), for example, the first camera aperture and first light aperture may together form a single aperture.

The camera apertures shown in the figures are substantially square in shape to correspond with the shape of the camera lens to which they correspond. The light apertures shown in the figures are substantially circular in shape to correspond with the shape of the light lens to which they correspond. The first camera aperture 11 extends along a first camera axis B (see FIG. 2) that is substantially perpendicular to the longitudinal axis A of the body 3. The second camera aperture 21 extends along a second camera axis C that is offset from the first camera axis by around 120°. The third camera aperture extends along a third camera axis D that is offset from the first camera axis B by around 120° and from the second camera axis C by around 120°. The images of the underground environment captured by the first camera 17 are offset from the images of the underground environment captured by the second camera 21 by around 120°. The images of the underground environment captured by the second camera 21 are offset from the images of the underground environment captured by the third camera 23 by around 120°. The images of the underground environment captured by the third camera 23 are offset from the images of the underground environment captured by the first camera 17 by around 120°. As such, the images captured by the first 17, second 23 and third 25 cameras are able to be combined to generate 360° images of the underground environment.

As will be apparent to the skilled addressee, any number of cameras could be incorporated into the assembly to suit the requirements of a specific application and the selection of equipment more generally. Also, as will be apparent to the skilled addressee, the angle of orientation with respect to the cameras does not necessarily need to precisely 120° when three cameras are implemented in the design. A range of 90-180° as an angle of orientation between the cameras may be appropriate. Having said that, the applicant has determined that the disclosed angles of relative orientation between the cameras (and associated lights) provides an effective embodiment for the image capturing assembly.

As is shown in FIGS. 1 to 4, the first camera 17 is disposed towards the proximal 5 end of the body. The second camera 23 is disposed below and orientated by around 120° with respect to the first camera 17. The first light aperture 13 extends along a first light axis (not shown) that is substantially perpendicular to the longitudinal axis A of the body 3 (e.g. substantially parallel to and offset from the first camera axis B). The second light aperture extends along a second light axis (not shown) that is offset from the first light axis (not shown) by around 120° (i.e. the angle between the axes is around 120°). The first light axis is also spaced from the second light axis along the length of the body. Similar to the first light axis, the second light axis is substantially perpendicular to the longitudinal axis A of the body 3. The third light aperture extends along a third light axis (not shown) that is offset from the first light axis (not shown) by around 120° and from the second light axis (not shown) by around 120° (i.e. the angle between each of the axes is around 120°). The third light axis is also spaced from the second light axis along the length of the body. Similar to the first and second light axes, the third light axis is substantially perpendicular to the longitudinal axis A of the body 3.

As is best shown in FIG. 2, the first light aperture includes three first light apertures that are each disposed in the outer wall of the body, the three first apertures 29, 31, 33 that are disposed in close proximity to one another. The second and third light apertures also include three apertures that are disposed in close proximity to one another.

Figure 8:
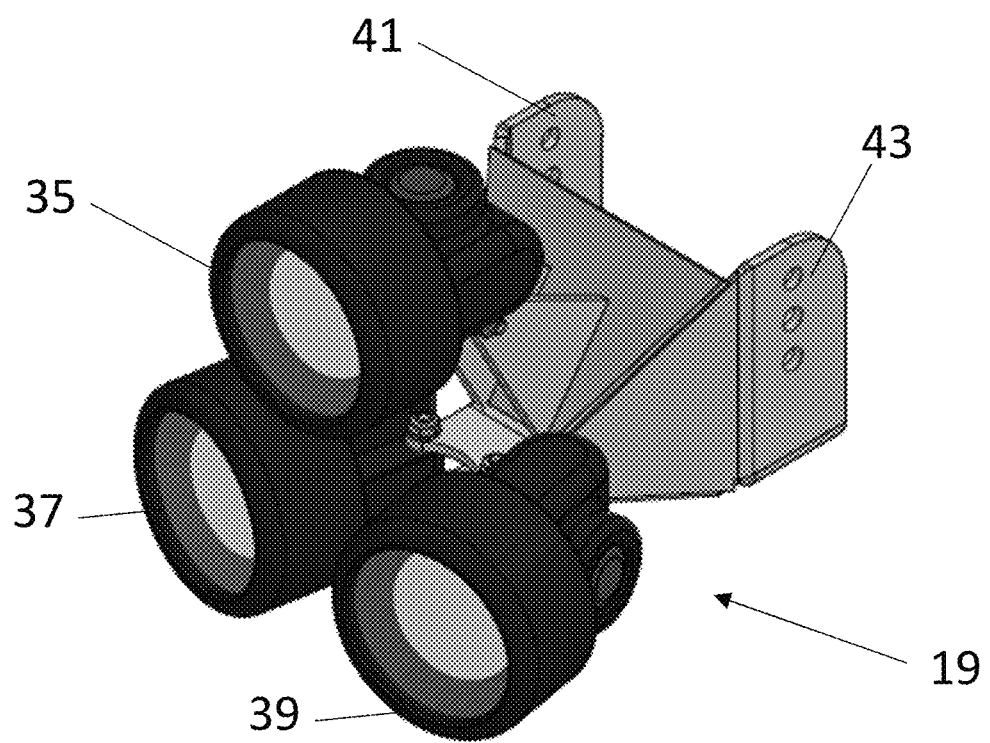
FIG. 8 provides a perspective view of a light of the assembly shown in FIG. 1.
Figure 9:
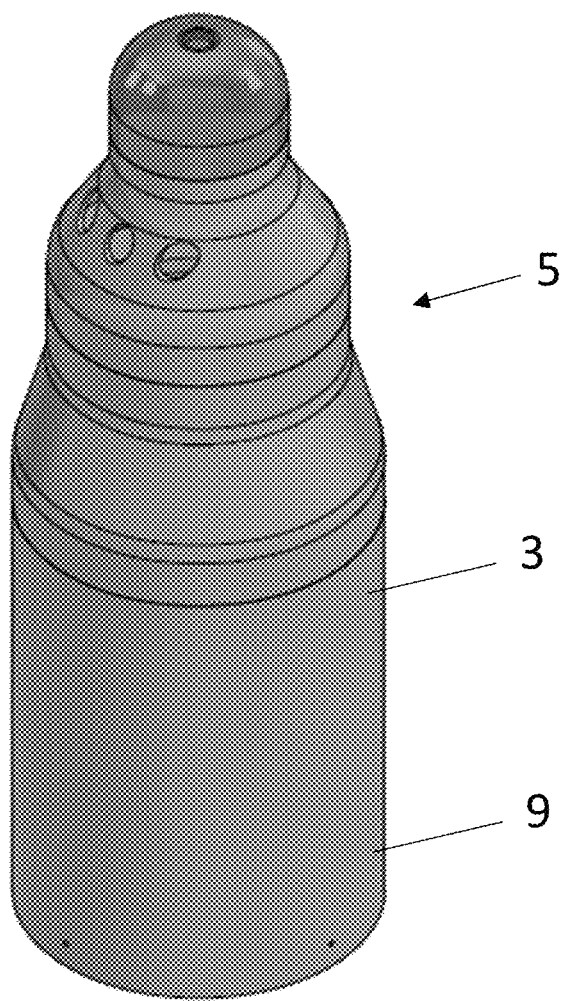
FIG. 9 provides a perspective view of another portion of the housing of the assembly shown in FIG. 1.
Figure 10:
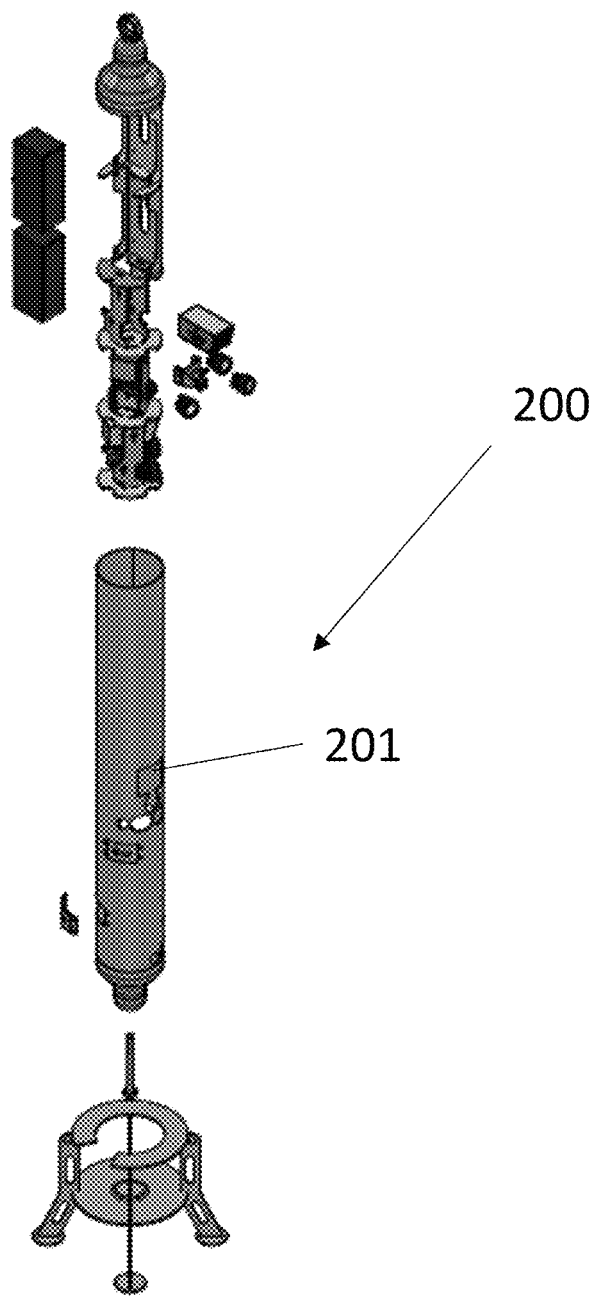
FIG. 10 provides an exploded view of an image capturing assembly according to a second embodiment of the present disclosure.
Figure 11:
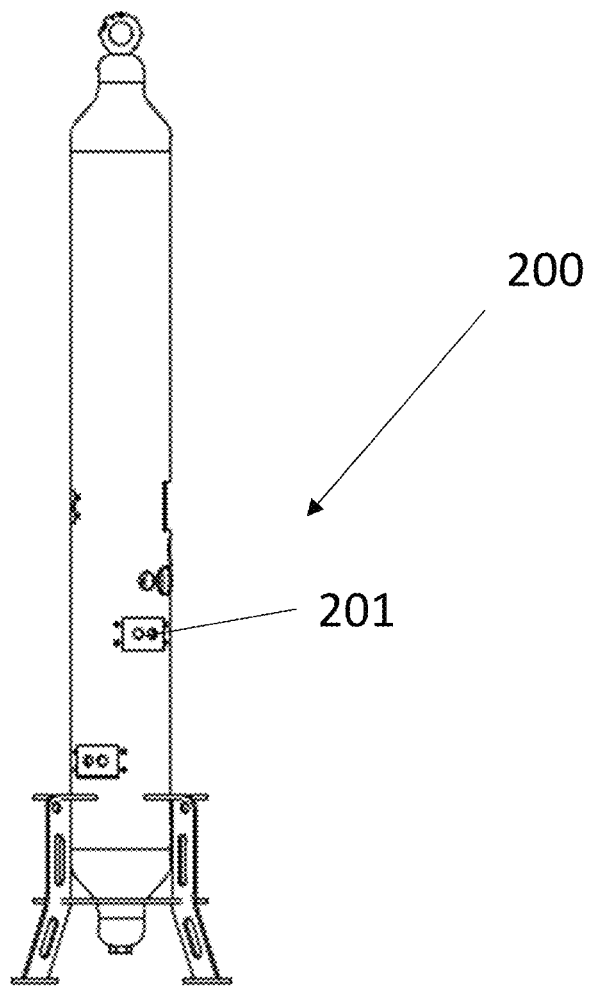
FIG. 11 provides a side view of the image capturing assembly shown in FIG. 10.
Figure 12:
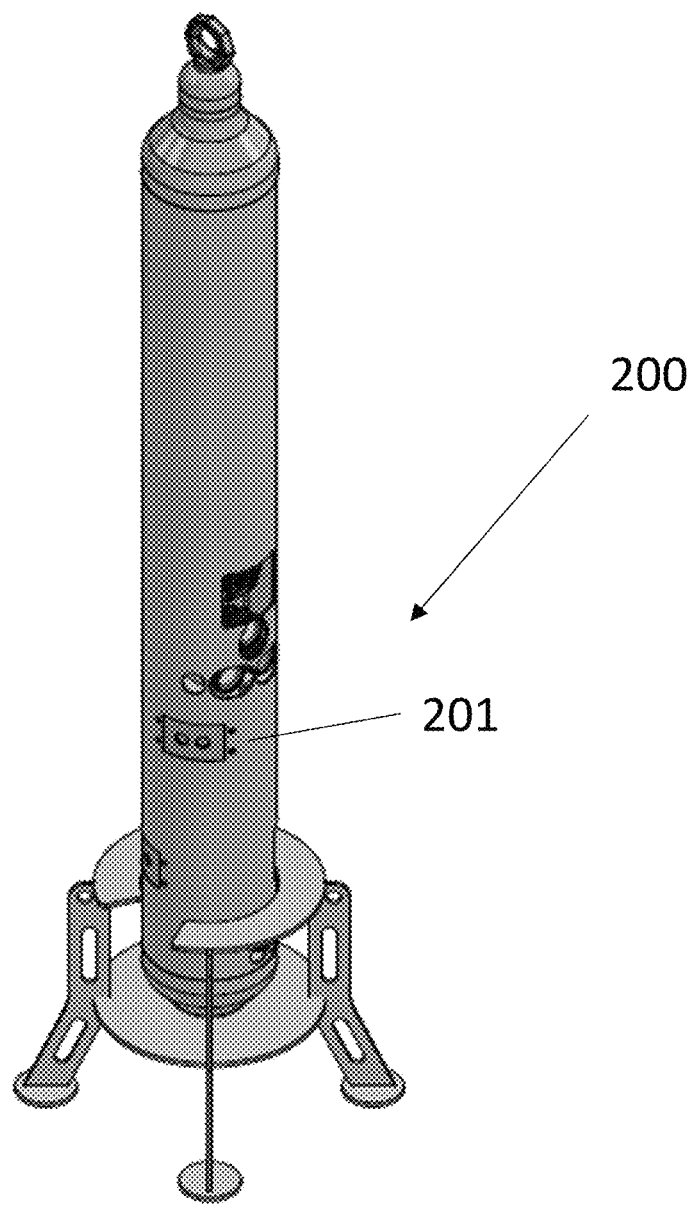
FIG. 12 provides a perspective view of the image capturing assembly shown in FIG. 10.
Figure 13:
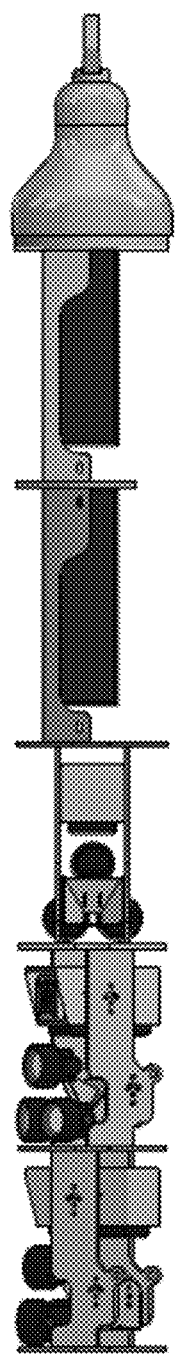
FIG. 13 provides a side view of the internal support of the assembly shown in FIG. 10.
Figure 14:
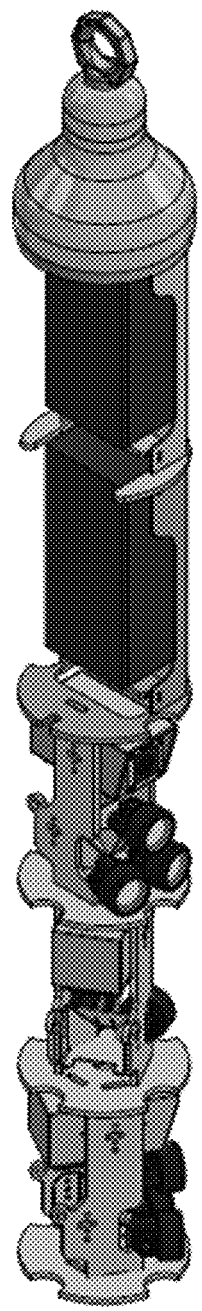
FIG. 14 provides a perspective view of the internal support of the assembly shown in FIG. 10.

As is shown in FIG. 8, the detailed embodiment of the first light 19 includes three lights 35, 37, 39. When mounted within the chamber of the elongate body 3, each of the three lights are substantially aligned with one of the three first light apertures 29, 31, 33 (see FIG. 2). In the detailed embodiment, the lights 35, 37, 39 are disposed adjacent to one another to form a triangular shape. The light 19 includes a support 41 that is configured to support the lights 35, 37, 39 and to mount the light 19 within the chamber of the body 3 of the assembly 1. The support 41 includes a plurality of mounting apertures 43 that enables the height of the light 19 to be varied with respect to the chamber of the body 3 to ensure that the lights 35, 37, 39 align with the respective apertures through the outer wall of the body 3. Each of the lights 35, 37, 39 are pivotally mounted to the support 41 to allow for the angle of the lights 35, 37, 39 to be adjusted if required. The second and third lights in the detailed embodiment are structurally the same as the first light 19. While alternate lighting numbers and positioning could be implemented, the Applicant has determined that the disclosed arrangement provides an effective lighting system for the image capturing assembly. It was determined that the inclusion of single light per camera meant that the power draw was dependent on the power supply from the cameras which reduced the run-time. As such, the detailed embodiment includes three lights for each camera. The three lights are independently powered (internally). In the detailed embodiment, each light has a diffuser that is fitted to diffuse the light intensity and allow a more even spread of light in the area of the camera viewing angle. Thus, the number, location (supported directly below each camera) and design of the lights, as described above, together provide an effective combination with each camera to capture images of an underground environment.

Referring now to FIGS. 5 and 6, the image capturing assembly will be described in further detail. The assembly includes an elongate support assembly 43 mounted within the chamber of the body 3. The elongate support assembly 43 extends along the longitudinal axis A of the body between the distal 5 and proximal 7 ends of the body 3 and is configured to support the first camera 17 and first light 19.

The elongate support assembly includes a first spaced pair of mounting flanges 45, 47 extending substantially parallel to the longitudinal axis A. The first camera 17 is mounted between the first pair of spaced flanges 45, 47 at a first position. The first light 17 is mounted between the first pair of spaced flanges 45, 47 at a second position. The first position is disposed above the second position in use (i.e. the first position is disposed towards the proximal, or upper, end of the assembly relative to the second position). The elongate support assembly 43 includes first 49 and second 51 plates that extend substantially perpendicular to the first pair of mounting flanges 45, 47. The first plate 49 is mounted to an upper end of each of the first pair of mounting flanges 45, 47. The second plate 51 is mounted to a lower end of each of the first pair of mounting flanges 45, 47. The first light support 41 (see FIG. 8) is mounted between the first pair of mounting flanges 45, 47.

The elongate support assembly includes a second spaced pair of mounting flanges 53, 55 that extend substantially parallel to the longitudinal axis A of the body 3. The second camera 21 is mounted between the second pair of spaced flanges 53, 55 at a third position. The second light 25 is mounted between the second pair of spaced flanges 53, 55 at a fourth position. The third position is disposed above the fourth position in use (i.e. the third position is disposed towards the proximal, or upper, end of the assembly relative to the fourth position). The elongate support assembly 43 also includes a third plate 57 that extends substantially parallel to the first 49 and second 51 plates. The second pair of mounting flanges 53, 55 is mounted between the second 51 and third 57 plates such that the second pair of mounting flanges 53, 55 are offset from the first pair of mounting flanges 45, 47 by 120° (i.e. the pairs of flanges are orientated at 120° with respect to one another). The support of the second light 25 is mounted between the second pair of mounting flanges 53, 55.

The elongate support assembly 43 includes a third spaced pair of mounting flanges 59, 61 extending substantially parallel to the longitudinal axis A. The third camera 23 is mounted between the third pair of spaced flanges 59, 61 at a fifth position. The third light 27 is mounted between the third pair of spaced flanges 59, 61 at a sixth position. The fifth position is disposed above the sixth position in use (i.e. the fifth position is disposed towards the proximal, or upper, end of the assembly relative to the sixth position). The elongate support assembly 43 includes a fourth plate 63 that extends substantially parallel to the first 49, second 51 and third 57 plates. The third pair of mounting flanges 59, 61 is mounted between the third 57 and fourth 63 plates such that the third pair of mounting flanges 59, 61 are offset from the first and second pair of mounting flanges by 120° (i.e. the pairs of flanges are orientated at 120° with respect to one another). The support of the third light 25 is mounted between the third pair of mounting flanges 59, 61.

The image capturing assembly 1 includes a first junction box 65 configured to allow electrical power and data communication to be connected to the assembly 1. The support assembly 43 includes a fourth spaced pair of mounting flanges (only one 67 of the two is shown in FIGS. 5 and 6 as the second is obscured by the junction box 65) extending substantially parallel to the longitudinal axis A. The support assembly 43 also includes a first backing plate 69 (see FIG. 1) mounted between the fourth pair of mounting flanges. The first backing plate 69 has an aperture 71 formed therethrough that is configured to allow for electrical power and data communication to be connected to the first junction box 65. The first junction box 65 is mounted between the fourth pair of spaced flanges at a seventh position such that the first junction box 65 is disposed adjacent (e.g. seated against) the first backing plate 69, the seventh position being disposed above the first position in use (i.e. towards the proximal end 5 of the assembly 1 relative to the first position). The support assembly 43 includes a fifth plate 73 that extends substantially parallel to the first 49, second 51, third 57 and fourth 63 plates, the fourth pair of mounting flanges being mounted between the first 49 and fifth 73 plates.

In the detailed embodiment, the assembly 1 includes a second junction box 75 configured to allow electrical power and data communication to be connected to the assembly. In the detailed embodiment, the assembly includes two junction boxes that are fitted to allow one media converter per camera (communications) and power for the cameras. This arrangement provides sufficient capacity to accommodate the physical size of the hardware in the detailed embodiment. In another embodiment, the junction box may be a different size (e.g. a single long junction box in lieu of two junction boxes).

The support assembly 43 includes a fifth spaced pair of mounting flanges (only one 77 of the two is shown in FIGS. 5 and 6 as the second is obscured by the junction box 75) extending substantially parallel to the longitudinal axis A and a second backing plate 79 (see FIG. 1) mounted between the fifth pair of mounting flanges. The second backing plate 79 includes an aperture 81 formed therethrough that is configured to allow for electrical power and data communication to be connected to the second junction box 75. The second junction box 75 is mounted between the fifth pair of spaced flanges at an eighth position such that the second junction box 75 is disposed adjacent (e.g. seated against) the second backing plate 79. The eighth position is disposed above the seventh position in use (i.e. towards the proximal end 5 of the assembly 1 relative to the seventh position). A sixth plate 83 extends substantially parallel to the first 49, second 51, third 57, fourth 63 and fifth 73 plates. The fifth pair of mounting flanges are mounted between the fifth 73 and sixth 83 plates.

The assembly 1 includes an uninterrupted power supply (UPS) 85 configured to supply power to the assembly (e.g. to the cameras and lights of the assembly). The UPS 85 is mounted to (e.g. seated on) the sixth plate 83 such that it is disposed adjacent the proximal end 5 of the assembly.

Figure 4:
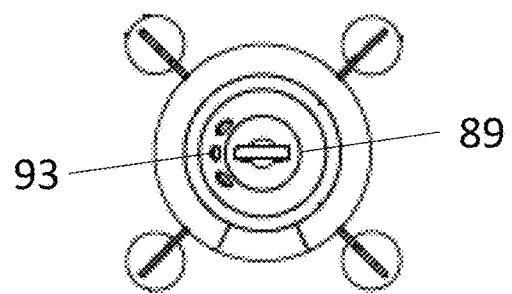
FIG. 4 provides a top view of the image capturing assembly shown in FIG. 1.
Figure 7:
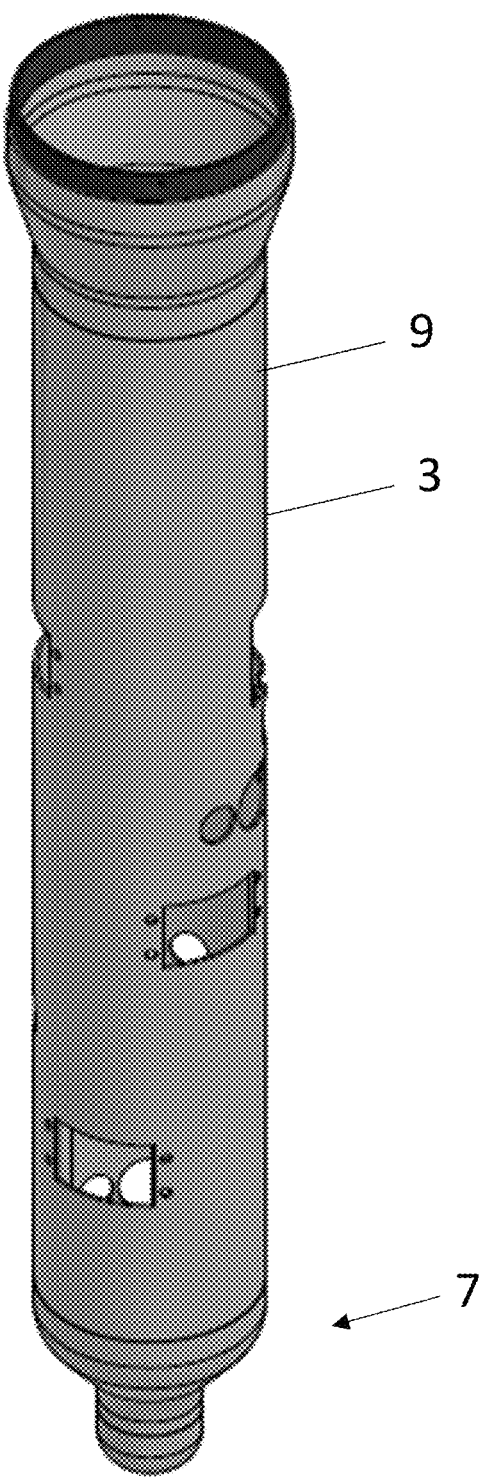
FIG. 7 provides a perspective view of a portion of the housing of the assembly shown in FIG. 1.

As is best shown in FIG. 2, the body 3 includes a substantially cylindrical portion 87 disposed between the proximal 5 and distal ends 7 of the body 3. The body 3 also includes a first tapered nose portion 89 disposed at the proximal end 5 of the body 3. The first tapered nose portion 89 is connected (e.g. welded) to the cylindrical portion 87 of the body. The lifting lug 15 is mounted (e.g. welded) to the first tapered nose portion 89. As is best shown in FIG. 3, the body includes a second tapered nose portion 91 disposed at the distal end 7 of the body 3. The second tapered nose portion 91 is also connected (e.g. welded) to the cylindrical portion 87 of the body 3. As is best shown in FIG. 4, the first tapered portion 89 comprises one or more apertures 93 formed therethrough to allow electrical power and data communication cables to enter the chamber of the assembly 1.

The first tapered portion 89 (e.g. a lid) is conical and distinct in design to allow the entire housing to protrude from a borehole which may or may not be metal cased into a harsh environment. The shape allows the assembly to be withdrawn upwards without catching and merely deflecting any obstructions providing the hole diameter is suffice. Similarly, the second tapered nose portion 91 is conical and distinct in design to allow the entire housing to protrude from a borehole which may or may not be metal cased into a harsh environment. The shape allows the assembly to be lowered downwards without catching and merely deflecting any obstructions providing the hole diameter is suffice.

Returning now to FIG. 2, the cylindrical portion 87 of the body 3 will be described in further detail. In the detailed embodiment, the cylindrical portion 87 of the body includes a bulbous portion 93 disposed towards the proximal end 5 of the body 3, the bulbous portion being connected to the first tapered nose 89 (i.e. the bulbous portion is located at the upper end of the cylindrical portion 87). The cylindrical portion 87 also includes a narrow portion 95 disposed towards the distal end 7 of the body 3, the narrow portion 95 being disposed between a lower portion of the bulbous portion 93 and the second tapered nose 91. The narrow portion 95 has a first cross-sectional diameter and the bulbous portion 93 has a second cross-sectional diameter, the first cross-sectional diameter being less than the second cross-sectional diameter. The UPS 85 is disposed within (e.g. housed by) the bulbous portion 93 of the body. The cameras and lights are disposed within (e.g. housed by) the narrow portion 95 of the body.

As such, the bulbous portion 93 is designed to allow the UPS to be fitted internally. The cylindrical portion 87 (e.g. lower region of the body) has a reduced diameter to allow the assembly to protrude through the hole at the bottom and reduce the chance of getting caught on any debris or materials (e.g. roof support mesh underground) while still being able to capture images of the underground environment.

The support 43 extends through the bulbous 93 and narrow 95 portions of the body 3. As is shown in FIG. 2, the welded connections between each portion of the body are tapered (e.g. angular) to allow for the assembly to be relatively easily raised and lowered in a borehole (e.g. the tapered edges reduce the amount of material that would otherwise be collected by the assembly in use).

The image capturing assembly 1 includes a stand 97 configured to receive and thereby support the body 3 when not operational. As is best shown in FIG. 1, the stand 97 includes a pair of spaced cylindrical plates 99, 101 mounted between three spaced legs. The pair of cylindrical plates 99, 101 include apertures formed therethrough of varying diameter to correspond with the shape of the second tapered nose 89 (i.e. the size of the apertures are configured to allow portions of the second tapered nose 89 to seat against the plates such that the assembly is able to be supported off the ground in use). The assembly also includes an access hatch 103, that may be used to access the chamber of the assembly, and a fastening device 105 (e.g. a bolt) that is inserted through an aperture of the second nose 89 and support 43 to secure the support 43 within the chamber of the assembly.

The image capturing assembly as detailed in FIGS. 1-9 is approximately 2400 mm in length and 450 mm in width (with the stand it is approximately 2486 mm in length and 475 mm in width).

A second embodiment of the image capturing assembly is shown in FIGS. 10-14. The second embodiment of the image capturing assembly 200 is a relatively narrow assembly compared with the first embodiment described with reference to FIGS. 1-9. This is because the second embodiment of the image capturing assembly 200 does not include a UPS. Unlike the first embodiment, the outer body 201 of the second assembly 200 does not include a bulbous portion and is instead substantially uniform in cross-section (other than the tapered noses at either end). The second embodiment is designed for smaller diameter boreholes and has an external power supply (unlike the first embodiment, which includes an onboard power supply). The power supply (e.g. an UPS) is located on the surface and supplied by a cable to the assembly, which may be connected to the winch rope when the assembly is lowered down the borehole.

Otherwise, the components (e.g. the lights and cameras) and structure (e.g. the internal support structure 203-see FIGS. 13 and 14) of the second embodiment are substantially similar to the first embodiment. The image capturing assembly of the second embodiment as detailed in FIGS. 10-14 is approximately 2000 mm in length and 400 mm in width (with the stand it is approximately 2122 mm in length and 475 mm in width).

Figure 15:
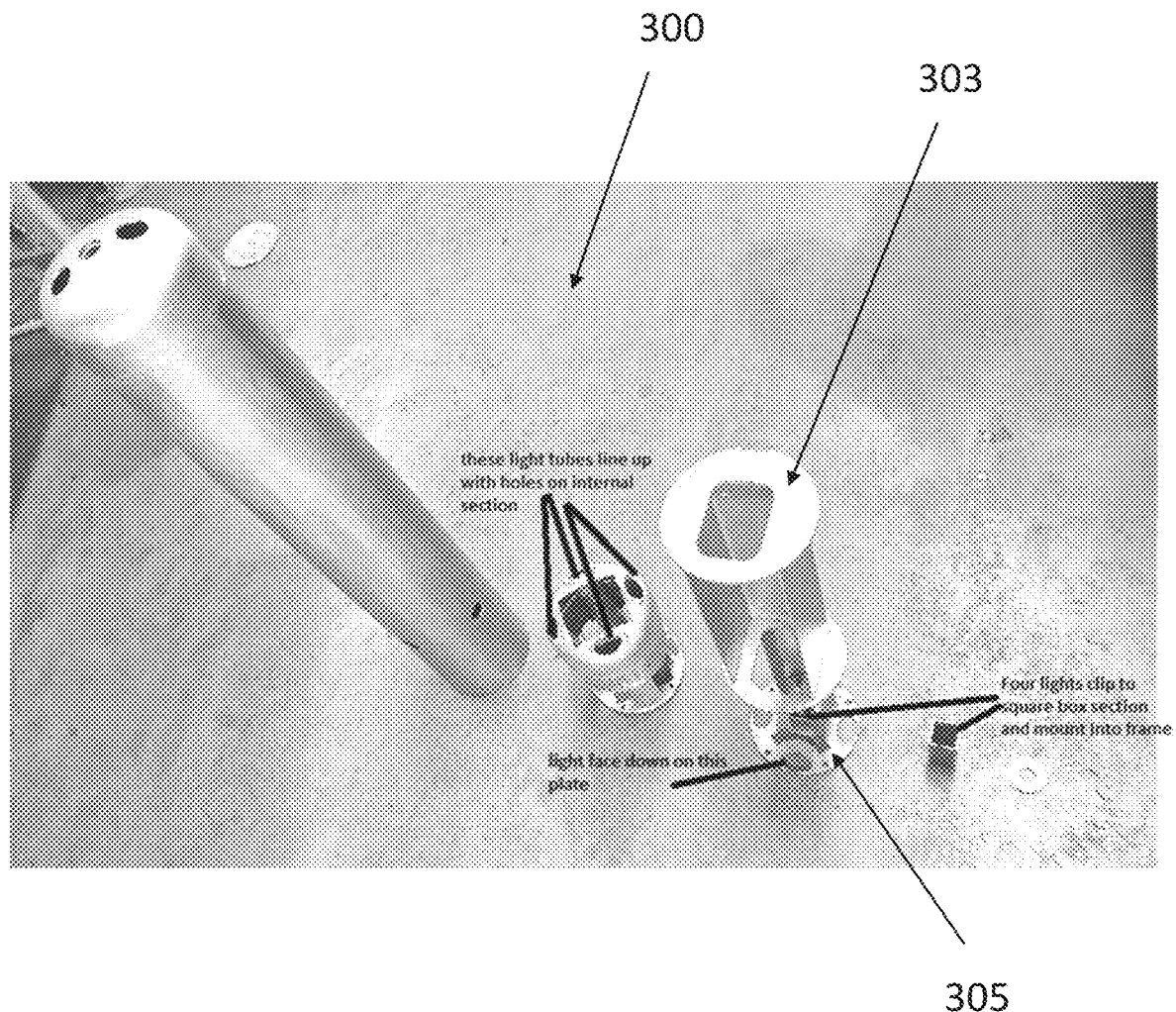
FIG. 15 provides a disassembled view of an image capturing assembly according to a third embodiment of the present disclosure.

A third embodiment of the image capturing assembly is shown in FIG. 15. FIG. 15 provides a view of the third embodiment of the housing of the assembly in the disassembled form. The third embodiment of the image capturing assembly 300 is a relatively narrow assembly compared with the first and second embodiments described with reference to FIGS. 1-14. The third embodiment is a slimline borehole camera system. The camera (not shown) is mounted on the bottom tip of the housing and when suspended faces vertical downwards, along with the lighting (looking substantially directly down the hole). It includes an external surface mounted power supply system. The internal support structure 303 include a plurality (four in the detailed embodiment) of apertures in a plate 305 at the lower end of the internal support structure. The apertures are configured to align with four lights (not shown), which may be the same or similar to those described above with respect to the first and second embodiments, that are supported face down on the plate 305. The internal support structure include a square shaped internal (centrally located) column to which the lights are mounted (e.g. clipped).

In use, the image capturing assembly disclosed is able to be lowered down a borehole from the surface. It may be suspended from a rope (e.g. mounted to the lifting lug) and lowered by a winch system. The information captured by the cameras may be supplied by fibre optic cable, which may be connected to the winch rope when the assembly is lowered. Data may be transferred from the camera system to, for example, a laptop computer on the surface. The image capturing assembly disclosed herein provides a camera system which can be safely used in an underground coal mine (e.g. in an explosion risk zone when the electrical componentry is rated appropriately) whether this be a sealed or unsealed area of the mine. The assembly is able to be lowered down a borehole to for the purpose of analysing the underground conditions to facilitate the safe recovery of the operation after an incident. When 'Ex ia' rated components are implemented into the assembly, in combination with the design of the assembly, the overall design allows the equipment to have a safe descent and ascent and maintain the ingress protection characteristics required for maintaining the explosion protection rating (e.g. 'Ex ia').

The word 'comprising' and forms of the word 'comprising' as used in this description and in the claims does not limit the invention claimed to exclude any variants or additions.

Modifications and improvements to the invention will be readily apparent to those skilled in the art. Such modifications and improvements are intended to be within the scope of this invention.

The invention claimed is:

1. An image capturing assembly configured to be lowered into, and withdrawn from, uncased boreholes disposed within an explosion risk zone of an underground mining environment, the assembly comprising;
    an elongate body, the body extending along a longitudinal axis of the body between proximal and distal ends, the body comprising;
        a cylindrical portion disposed between the proximal and distal ends of the body, the cylindrical portion comprising an outer wall that defines an internal chamber therein;
        first, second and third camera apertures and first, second and third lighting apertures disposed in the outer wall of the body;
    first, second and third cameras mounted within the chamber such that the first, second and third cameras are substantially aligned with the first, second and third camera apertures respectively, the first, second and third cameras being configured to capture images of the underground environment; and
    first, second and third lighting arrangements pivotally mounted within the chamber and configured to illuminate the underground environment, the first, second and third lighting arrangements being aligned with the first, second and third lighting apertures respectively, and disposed adjacent the first, second and third cameras respectively, wherein;
    the first lighting aperture comprises three first light apertures that are each disposed in the outer wall of the body, the three first apertures being disposed in close proximity to one another;
    the second lighting aperture comprises three second light apertures that are each disposed in the outer wall of the body, the three second apertures being disposed in close proximity to one another; and
    the third lighting aperture comprises three third light apertures that are each disposed in the outer wall of the body, the three third apertures being disposed in close proximity to one another.

2. An image capturing assembly according to claim 1, wherein;
    the first camera aperture extends along a first camera axis that is substantially perpendicular to the longitudinal axis of the body;
    the second camera aperture extends along a second camera axis that is offset from the first camera axis by around 120°;
    the third camera aperture extends along a third camera axis that is offset from the first camera axis by around 120° and from the second camera axis by around 120°;
    the images of the underground environment captured by the first camera are offset from the images of the underground environment captured by the second camera by around 120°;
    the images of the underground environment captured by the second camera are offset from the images of the underground environment captured by the third camera by around 120°; and
    the images of the underground environment captured by the third camera are offset from the images of the underground environment captured by the first camera by around 120°.

3. An image capturing assembly according to claim 2, wherein the images captured by the first, second and third cameras are able to be combined to generate 360° images of the underground environment.

4. An image capturing assembly according to claim 3, wherein;
    the first lighting aperture extends along a first light axis that is substantially perpendicular to the longitudinal axis of the body;
    the second lighting aperture extends along a second light axis that is offset from the first light axis by around 120°; and
    the third lighting aperture extends along a third light axis that is offset from the first light axis by around 120° and from the second light axis by around 120°.

5. An image capturing assembly according to claim 4, wherein;
    the first lighting arrangement comprises three lights, each of the three lights being substantially aligned with one of the three first light apertures;
    the second lighting arrangement comprises three lights, each of the three lights being substantially aligned with one of the three second light apertures; and
    the third lighting arrangement comprises three lights, each of the three lights being substantially aligned with one of the three third apertures.

6. An image capturing assembly according to claim 1, comprising;
    an elongate support assembly mounted within the chamber, the elongate support assembly extending along the longitudinal axis of the body between the distal and proximal ends of the body and being configured to support the first, second and third cameras, and the first, second and third lighting arrangements.

7. An image capturing assembly according to claim 6, wherein the elongate support assembly comprises;
    a first spaced pair of mounting flanges extending substantially parallel to the longitudinal axis of the body, wherein the first camera is mounted between the first pair of spaced flanges at a first position, and wherein the first lighting arrangement is mounted between the first pair of spaced flanges at a second position, the first position being disposed above the second position in use.

8. An image capturing assembly according to claim 7, wherein the elongate support assembly comprises;
first and second plates that extend substantially perpendicular to the first pair of mounting flanges, the first plate being mounted to an upper end of each of the first pair of mounting flanges, the second plate being mounted to a lower end of the each of the first pair of mounting flanges.

9. An image capturing assembly according to claim 8, wherein the first lighting arrangement comprises a first light support configured to mount the first lighting arrangement between the first pair of mounting flanges.

10. An image capturing assembly according to claim 9, wherein the elongate support assembly comprises;
a second spaced pair of mounting flanges extending substantially parallel to the longitudinal axis of the body, wherein the second camera is mounted between the second pair of spaced flanges at a third position, and wherein the second lighting arrangement is mounted between the second pair of spaced flanges at a fourth position, the third position being disposed above the fourth position in use.

11. An image capturing assembly according to claim 10, wherein the elongate support assembly comprises;
a third plate that extends substantially parallel to the first and second plates, the second pair of mounting flanges being mounted between the second and third plates such that the second pair of mounting flanges are offset from the first pair of mounting flanges by 120°.

12. An image capturing assembly according to claim 11, wherein the second lighting arrangement comprises a second light support configured to mount the second lighting arrangement between the second pair of mounting flanges.

13. An image capturing assembly according to claim 12, wherein the elongate support assembly comprises;
a third spaced pair of mounting flanges extending substantially parallel to the longitudinal axis of the body, wherein the third camera is mounted between the third pair of spaced flanges at a fifth position, and wherein the third lighting arrangement is mounted between the third pair of spaced flanges at a sixth position, the fifth position being disposed above the sixth position in use.

14. An image capturing assembly according to claim 13, wherein the elongate support assembly comprises;
a fourth plate that extends substantially parallel to the first, second and third plates, the third pair of mounting flanges being mounted between the third and fourth plates such that the third pair of mounting flanges are offset from the first and second pair of mounting flanges by 120°.

15. An image capturing assembly according to claim 14, wherein the third lighting arrangement comprises a third light support configured to mount the third lighting arrangement between the third pair of mounting flanges.

16. An image capturing assembly according to claim 1, wherein the body comprises;
a first tapered nose portion disposed at the proximal end of the body and connected to the cylindrical portion, the first tapered nose portion comprising an exterior surface configured to inhibit catching obstructions when the image capturing assembly is withdrawn from the borehole; and a second tapered nose portion disposed at the distal end of the body and connected to the cylindrical portion, the second tapered nose portion comprising an exterior surface configured to inhibit catching obstructions when the image capturing assembly is lowered into the borehole;
and wherein the first tapered portion comprises one or more apertures formed therethrough to allow electrical power and data communication cables to enter the chamber.

17. An image capturing assembly according to claim 16, wherein the cylindrical portion of the body comprises;
a bulbous portion disposed towards the proximal end of the body, the bulbous portion being connected to the first tapered nose; and
a narrow portion disposed towards the distal end of the body, the narrow portion being disposed between a lower portion of the bulbous portion and the second tapered nose;
wherein the narrow portion has a first cross-sectional diameter and the bulbous portion has a second cross-sectional diameter, the first cross-sectional diameter being less than the second cross-sectional diameter.

18. An image capturing assembly according to claim 17 wherein an uninterrupted power supply is disposed within the bulbous portion of the body.

19. A method of capturing images of an underground environment of an explosion risk zone of a mine with an image capturing assembly comprising;
an elongate body configured to be lowered into, and withdrawn from a borehole disposed within the underground environment, the body extending along a longitudinal axis of the body between proximal and distal ends, the body comprising; an outer wall that defines an internal chamber therein;
first, second and third camera apertures and
first, second and third lighting apertures disposed in the outer wall;
first, second and third cameras mounted within the chamber such that the first, second and third cameras are substantially aligned with the first, second and third camera apertures respectively, the first, second and third cameras being configured to capture images of the underground environment, and
first, second and third lighting arrangements pivotally mounted within the chamber and configured to illuminate the underground environment, the first, second and third lighting arrangements being aligned with the first, second and third lighting apertures respectively, and disposed adjacent the first, second and third cameras respectively,
wherein;
the first lighting aperture comprises three first light apertures that are each disposed in the outer wall of the body, the three first apertures being disposed in close proximity to one another;
the second lighting aperture comprises three second light apertures that are each disposed in the outer wall of the body, the three second apertures being disposed in close proximity to one another; and
the third lighting aperture comprises three third light apertures that are each disposed in the outer wall of the body, the three third apertures being disposed in close proximity to one another;
the method comprising;
mounting the image capturing assembly to a winch system;

lowering the image capturing assembly down the borehole;
capturing images of the underground environment with the cameras;
communicating the captured images to a computer system, and withdrawing the assembly from the borehole.

\* \* \* \* \*